(12) United States Patent
Chun et al.

(10) Patent No.: US 9,714,352 B2
(45) Date of Patent: Jul. 25, 2017

(54) DISPERSED WHITE INKS

(71) Applicant: Hewlett-Packard Development Company, L.P., Houston, TX (US)

(72) Inventors: Doris Chun, Santa Clara, CA (US); Hou T. Ng, Campbell, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/118,023

(22) PCT Filed: Mar. 31, 2014

(86) PCT No.: PCT/US2014/032320
§ 371 (c)(1),
(2) Date: Aug. 10, 2016

(87) PCT Pub. No.: WO2015/152863
PCT Pub. Date: Oct. 8, 2015

(65) Prior Publication Data
US 2017/0158889 A1    Jun. 8, 2017

(51) Int. Cl.
*C09D 11/037* (2014.01)
*C09D 11/10* (2014.01)
*C09D 11/108* (2014.01)

(52) U.S. Cl.
CPC ............ *C09D 11/037* (2013.01); *C09D 11/10* (2013.01); *C09D 11/108* (2013.01)

(58) Field of Classification Search
CPC ..... C09D 11/023; C09D 11/037; C09D 11/10; C09D 11/108; C09D 11/00; C09D 11/02; G03G 9/04; B32B 37/00; C08K 3/22; C08K 5/5419

USPC ........................................................ 347/100
See application file for complete search history.

(56) References Cited

U.S. PATENT DOCUMENTS

| | | | |
|---|---|---|---|
| 3,869,397 A | 3/1975 | Tellier | |
| 4,293,478 A | 10/1981 | Sugio et al. | |
| 4,973,439 A | 11/1990 | Chang et al. | |
| 6,326,119 B1 | 12/2001 | Hollenbaugh, Jr. et al. | |
| 7,022,752 B2 * | 4/2006 | Hayashi | B82Y 30/00 523/210 |

(Continued)

FOREIGN PATENT DOCUMENTS

| | | |
|---|---|---|
| WO | WO-2011009488 | 1/2011 |
| WO | WO-2013166139 | 11/2013 |

OTHER PUBLICATIONS

International Search Report and Written Opinion for International Application No. PCT/US2014/032320 dated Dec. 19, 2014, 10 pages.

(Continued)

*Primary Examiner* — Huan Tran
*Assistant Examiner* — Alexander D Shenderov
(74) *Attorney, Agent, or Firm* — HP Inc. Patent Department (57) ABSTRACT

A dispersed white ink contains $TiO_2$, wherein the $TiO_2$ includes particles contained in a thermoplastic polymer resin matrix and wherein the particles have a maximum interparticle distance of less than 1.0 μm and exhibit a statistical variance of less than 0.02. A process for manufacturing the dispersed white ink is also provided.

15 Claims, 4 Drawing Sheets

(56) References Cited

U.S. PATENT DOCUMENTS

| | | |
|---|---|---|
| 7,563,835 B2 | 7/2009 | Parris et al. |
| 8,287,112 B2 | 10/2012 | Van Thillo et al. |
| 2003/0031438 A1* | 2/2003 | Kambe .................. B82Y 20/00 385/122 |
| 2007/0056684 A1 | 3/2007 | Yamamoto et al. |
| 2012/0092427 A1* | 4/2012 | Ganapathiappan .. B41M 7/0027 347/101 |
| 2013/0160672 A1 | 6/2013 | Kasperchik |
| 2014/0176652 A1* | 6/2014 | Toosi .................. C09D 11/322 347/88 |

OTHER PUBLICATIONS

J. H. Kim et al. "Control of the Dispersion Properties of a TiO2 Nano Powder for Electronic Paper". Jrnl. of the Korean Physical Society. Jun. 2006, vol. 48, No. 6, pp. 1329-1333.

* cited by examiner

DISPERSED WHITE INKS

BACKGROUND

Materials have different physical properties. They require tailored processing techniques in order to achieve the full potential of their characteristics. For example, process color ink products utilizing organic pigments can have different processing parameters compared to white or metallic inks utilizing inorganic pigments. Particularly for white inks, titanium dioxide, or titania, is the most prominent pigment for white color due to its desirable optical properties. However, its high specific gravity (or density, ~4.3 g/cm$^3$) and hardness make TiO$_2$ difficult to formulate and process.

The penetration of digital printing into commercial flexible packaging has led to an increased demand for white ink. Its volume usage is projected to rise significantly in the near future. White ink currently has an inherent cost of extended production time, i.e., low ink production throughput. A potential process-related solution is to increase manufacturing throughput, thus reducing the cost per page.

DETAILED DESCRIPTION

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid", or "liquid vehicle" refers to the fluid in which the pigmented resin material of the present disclosure can be dispersed to form an ink dispersion. Such a carrier liquid can be formulated for electrophotographic printing so that the electrophotographic ink has a viscosity and conductivity for such printing, and may include a mixture of a variety of different agents, including without limitation, surfactants, organic solvents and co-solvents, charge control agents, viscosity modifiers, sequestering agents, and stabilizing agents. Though not part of the electrophotographic liquid vehicle per se, in addition to the pigment and resin, the liquid vehicle can further carry solid additives such as resins, latexes, UV curable materials, plasticizers, salts, charge control agents, etc.

As used herein, "co-solvent" refers to any solvent, including organic solvents, present in the electrophotographic liquid vehicle.

As used herein, "pigment" generally includes pigment colorants, magnetic particles, metallic particles, metal oxides such as aluminas, silicas, titanias, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In some examples, however, the pigment is a pigment colorant.

As used herein, $T_g$ is the glass transition temperature as calculated by the Fox equation: copolymer $T_g=1/[W_a(T_gA)+W_b(T_gB)+ \ldots ]$ where $W_a$=weight fraction of monomer A in the copolymer and $T_gA$ is the homopolymer $T_g$ value of monomer A, $W_b$=weight fraction of monomer B and $T_gB$ is the homopolymer $T_g$ value of monomer B, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. In some examples, "about" may refer to a difference of ±10%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1 to 3, from 2 to 4, and from 3 to 5, etc. This same principle applies to ranges reciting only one numerical value. Furthermore, such an interpretation should apply regardless of the breadth of the range or the characteristics being described.

It is understood that the dispersion of TiO$_2$ by milling can be very energy intensive. Milling time for TiO$_2$ can easily be double that relative to process colors, such as colored pigments, typically of taking upwards of 80 hours.

In accordance with the teachings herein, to minimize the time and energy needed during milling for particle dispersion, the high shearing power of mechanical extrusion may be utilized to handle the dispersion step and then may be coupled with tools capable of particle size reduction such as bead mill and/or microfluidizer to complete the production. The white ink particles as produced via the as-mentioned approach have $TiO_2$ pigments distributed more uniformly within its resin matrix, which is not the case with ink products subjected to regular production time. The containment of $TiO_2$ within the resin matrix further suppresses the print background issues.

Specifically, uniformity of pigment distribution may be based on statistical analysis of the average distance between pigment particles, in which the mean value gives useful information about the average distance between particles which is dependent on loading, but the variance indicates how far each particle is from the mean and it is independent of pigment loading. The variance is the average of the squared differences from the mean; if all particles are equal distant, then the variance would equal 0. This means that the smaller the number, the narrower the distribution of interparticle distance. A variance of <0.020 is considered to be acceptable.

Summarizing, a highly dispersed white ink may be manufactured by an integrative dispersion process. By "highly dispersed" is meant that the pigment is essentially evenly dispersed, with no or negligible agglomerates observed.

The process may use an extruder, and in a first aspect, the control and setup of the extruder is discussed. In a second aspect, a description of the process is provided.

There may be two main stages of materials processing in the extruder to produce the final ink product. The individual stages are described below, and include materials integration and particle size reduction and dispersion.

Extruder Control and Setup.

The first stage of processing, materials integration, may be accomplished with a twin-screw extruder or other similar apparatus.

Polymer extrusion involves a specific screw design and processing temperature to incorporate (or compound) individual components together. Screw configuration depends at least on the number and type of components to be fed to the system. For example, two feeding funnels and one liquid injection port may be implemented. The first funnel may be for adding thermoplastic toner resin, while the second funnel may be for adding pigment. The liquid injector port may be for injecting the ink carrier fluid, such as a hydrocarbon-based carrier fluid, an example of which is ISOPAR® L (ISOPAR is a trademark of Exxon-Mobile Chemicals for a line of isoparaffinic liquids).

The screw may have two mixing zones, a first zone for dispersing pigment in the melted resin and a second zone for mixing the polymer-pigment melt with the ink carrier fluid.

Depending on the extruder, there can be more than three zones for materials loading, and the screw design can be arranged accordingly.

The screws can be assembled for light to heaving mixing, grinding, or just propelling.

The operating temperature of the extruder is dependent on the materials of choice and the morphology of the final extruded sample that is desired. It may be near the glass transition temperature $T_g$ and melting temperature $T_m$ of the resin. Specifically, the operating temperature may be above the $T_g$ and below the $T_m$ of the resin. Further, the operating temperature may also be above the $T_g$ of the resin when co-extruded with other materials, such as pigment and/or metals.

The extrusion speed may be dependent on several parameters, including materials loading speed, screw torque and RPM, process temperature, and extrusion materials properties. Depending on the screw setup, materials in between the twin screw can having different residence time. Residence time is the time required for materials to enter and exit the extruder. It can be increased by impeding the forward conveying movement of materials.

An example of an experimental setup and operation may include:
Operation temperature at 150° C.;
Mixing at 450 RPM;
Feeding rate at 20% of maximum power;
Port 1=Toner resin;
Port 3=Pigment; and
Port 5=Isoparaffinic liquid, such as ISOPAR® L.

An example of the materials composition that may be employed in the practice of the teachings is shown in Table I below, comprising a solid materials component and a liquid materials component:

TABLE I

Components and Concentrations.

| COMPONENT | CONCENTRATION 1* | CONCENTRATION 2** |
|---|---|---|
| Solid Materials (20 to 100 wt % of bulk) | | |
| Toner (thermoplastic) resin | 20 to 90 wt % | 35 to 65 wt % |
| Primary pigment ($TiO_2$) | 10 to 80 wt % | 35 to 65 wt % |
| Secondary pigment (P.B. 15:3) | 0.1 to 5 wt % | 0.5 to 1.5 wt % |
| Aluminum stearate | 0.1 to 3 wt % | 0.5 to 1 wt % |
| Other additives | 0.1 to 3 wt % | 0.5 to 1 wt % |
| Liquid Materials (0 to 80 wt % of bulk) | | |
| Isoparaffinic liquid (e.g., ISOPAR® L) | 0 to 80 wt % | 40 to 50 wt % |
| Silicone oil | 0 to 5 wt % | 0.5 to 2 wt % |
| Charge director | 0.1 to 10 wt % | 3 to 6 wt % |

NOTES:
*Concentration 1 is directed to an example of a comparatively broad composition range.
**Concentration 2 is directed to an example of a narrower concentration range.

The toner resin is a thermoplastic composition that is colorless and translucent (i.e., translucent over at least visible range of electromagnetic radiation). The thermoplastic resin may be any of the polyethylene resins commonly used in LEP inks, such as ethylene acid copolymers and ethylene vinyl acetate copolymers. Examples of such copolymers include, but are not limited to, ethylene acid copolymers; ethylene acrylic acid copolymers; methacrylic acid copolymers; ethylene vinyl acetate copolymers; copolymers of ethylene acrylic acid (60 to 99.9 wt %), acrylic acid, or methacrylic acid (40 to 0.1 wt %) and alkyls (with carbon chain lengths between 1 and 20 carbons, inclusive); esters of methacrylic acid or acrylic acid (0.1 to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid where the alkyl is from 1 to about 20 carbon atoms, such as methyl methacrylate (50 wt % to 90 wt %)/methacrylic acid (0 wt % to 20 wt %)/ethylhexylacrylate (10 wt % to 50 wt %)); ethylene-acrylate terpolymers; ethylene-acrylic esters-maleic anhydride (MAH) or glycidyl methacrylate (GMA) terpolymers; low molecular weight ethylene-acrylic acid ionomers (i.e., those having a molecular weight less than 1000 amu), or combinations thereof. In one example, the polymer resin is selected from the NUCREL® or BYNEL® family of polymers (available from DuPont Company, Wilmington, Del., USA, e.g., NUCREL® 403, NUCREL® 407, NUCREL® 609HS, NUCREL® 908HS, NUCREL® 1202HC, NUCREL® 30707, NUCREL® 1214, NUCREL® 903, NUCREL® 3990, NUCREL® 910, NUCREL® 925, NUCREL® 609, NUCREL® 599, NUCREL® 960, NUCREL® RX 76, NUCREL® 2806, BYNEL® 2002, BYNEL® 2014, and BYNEL® 2020), the ACLYN® family of polymers (available from Honeywell International, Inc., Morristown, N.J., USA, e.g., ACLYN® 201, ACLYN® 246, ACLYN® 285, and ACLYN® 295), or the LOTADER® family of polymers (available from Arkema, Inc., King of Prussia, Pa., USA, e.g., LOTADER® 2210, LOTADER® 3430, and LOTADER® 8200).

The secondary pigment may be Pigment Blue 15:3 (copper phthalocyanine). A blue pigment may be used as whitener, since $TiO_2$ pigments may have different undertones, some of which may look yellow. Aluminum stearate may be used to promote charging of the final ink particles. Other fatty acid salts with alumium can also be used; non-limiting examples include alumium oleate, aluminum palmitate, aluminum linoate, etc. Other additives may include inorganic fillers to improve materials durability and strength. Non-limiting examples include micro or nano silica and alumina.

Silicone oil may be used to assist image transfer during the printing process. The charge director may include, but is not limited to, lecithin, oil-soluble petroleum sulfonates (e.g., neutral Calcium Petronate®, neutral Barium Petronate®, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. In addition, the charge director as described in (PCT/US2006/018297 filed on May 10, 2006, which is incorporated herein by reference) can be used as well.

Process Description.

The second stage of processing, particle size reduction and dispersion, can be accomplished by dispersion tools such as milling or grinding machines, homogenizer or microfluidizer.

1. Milling/Grinding:

This may be the most appropriate method for size reduction if the extruded products are 100% solids. It will involves milling of pellets of extruded materials in ISOPAR® at about 30° to 80° C. in some examples or about 40° to 50° C. in other examples. The process temperature can also be profiled with a ramp up and then a cool down.

If a paste or powder is obtained after extrusion, these methods may also be appropriate for particle size reduction and dispersion. The solids may be processed with about 20 to 95 wt % liquid content in some examples or about 80 to 90 wt % liquid content in other examples.

2. Homogenizing/Microfluidizing:

If a paste or powder is obtained after extrusion, these methods can be utilized for particle size reduction and dispersion. The paste or powder may be processed with a total liquid content of about 20 to 95 wt % in some examples, or about 75 to 90 wt % in other examples.

Table II below shows the results for three reference samples (Examples 1-3) and for two integrated dispersions (ID) (Examples 4-5).

TABLE II

Results of Interparticle Distance.

| Example | Sample | Average Distance, nm | Minimum Distance, nm | Maximum Distance, μm | Variance |
|---|---|---|---|---|---|
| 1 | Reference 1 | 120 ± 0.13 | 10 | 1.21 | 0.0169 |
| 2 | Reference 2 | 170 ± 0.15 | 10 | 1.05 | 0.0238 |
| 3 | Reference 3 | 230 ± 0.26 | 10 | 1.36 | 0.0696 |
| 4 | ID 1 | 200 ± 0.07 | 80 | 0.5 | 0.0042 |
| 5 | ID 2 | 140 ± 0.13 | 10 | 0.9 | 0.0165 |

Table II shows the measured distance between particles based on SEM images. The Minimum Distance is the shortest distance measured between two unobstructed pigment particles. The Maximum Distance is the longest distance measured between two unobstructed pigment particles. The Variance is the statistical analysis of the sample pool, calculated as the average of $(mean-distance)^2$, or the average of the squared differences from the mean. The smaller the number, the narrower the distribution of interparticle distance. A variance in distance of less than 0.02 may be considered acceptable for the dispersed white ink.

Extrusion Polymer resin (25 g/min) and $TiO_2$ (11 g/min) were extruded via a lab-scale extruder process at 150° C. at 300 rpm. The Extrusion Polymer resin was NUCREL® 599 (a polyethylene co-polymethacrylic acid). The resulting polymer was water-cooled, followed by pelletization. The resulting sample was used for SEM statistical analysis. Under the identical processing conditions, an additional feed port was used to incorporate ISOPAR®. The resulting semi-solid mixture was processed into white ink.

Ink Processing

The semi-solid mixture was ground at 14 wt % NVS (non-volatile solids) with 5 mm beads from 700 to 1500 rpm for 8 hours. The resulting ink was diluted to 2 wt % NVS for on-press testing. The range of NVS may be 1 to 25 wt % during grinding, and about 1 to 10 wt % in the final ink composition. The ink after production can be concentrated to 20 to 100 wt %. The bead size can range from 1 mm to 250 mm. The grinding time can range from 2 hours to 100 hours. The final composition of ink may include ISOPAR®, resin, pigment, charge director, and silicon oil.

The final ink composition may be:

| | |
|---|---|
| thermoplastic resin | 11 to 89 wt %; |
| $TiO_2$ | 10 to 65 wt %; |
| secondary pigment | 0 to 3 wt %; |
| aluminum stearate | 0 to 1 wt %; |
| other additives | 1 to 5 wt %; |
| silicone oil | 0 to 5 wt %; |
| charge director | 0.1 to 10 wt %; and |
| isoparaffinic liquid, such as ISOPAR ® | balance. |

HP-Indigo samples were used as the reference for performance (which meets the desired ink opacity) and the SEM cross-section of its printed ink layer was examined. For comparison, an SEM cross-section of pellets containing Nucrel 925/A-C 6/$TiO_2$ (45 wt % and >55 wt % $TiO_2$) from extrusion at 36 g/min to 39 g/min were used.

Figure 1A:
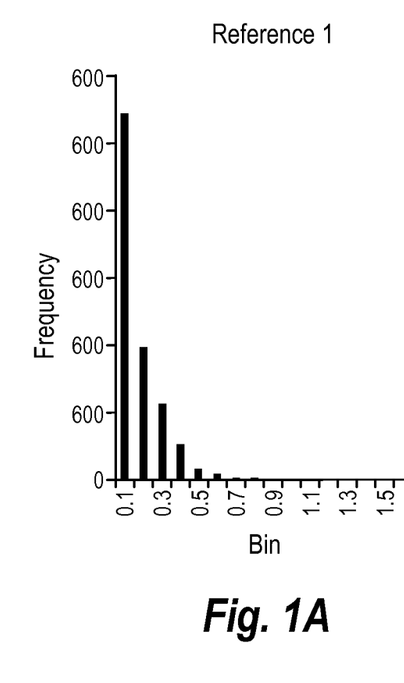
FIGS. 1A-1C are histograms of sample interparticle distance for three different reference samples.
Figure 1B:
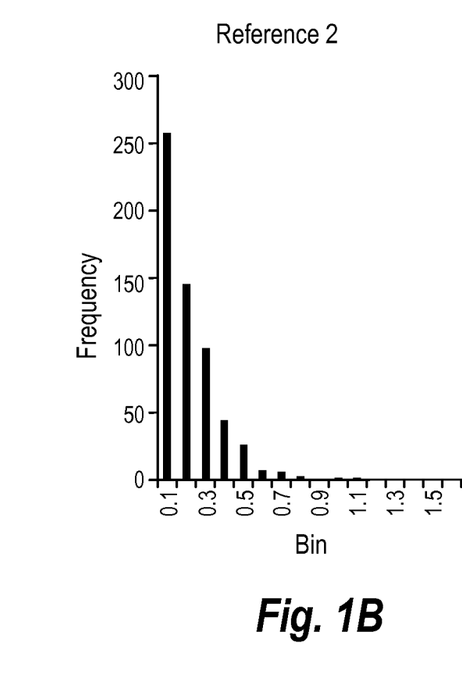
Figure 1C:
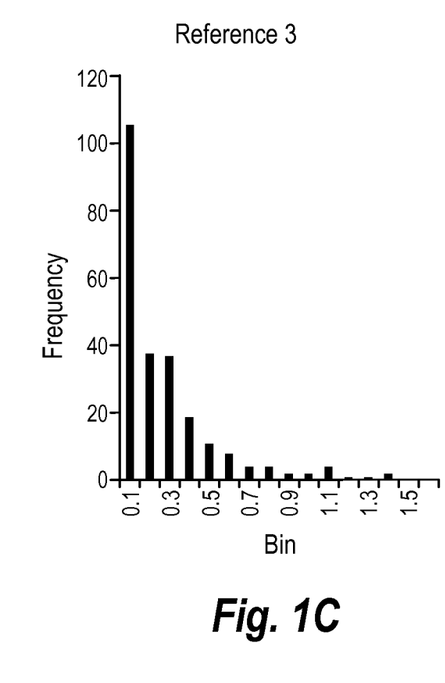
Figure 2A:
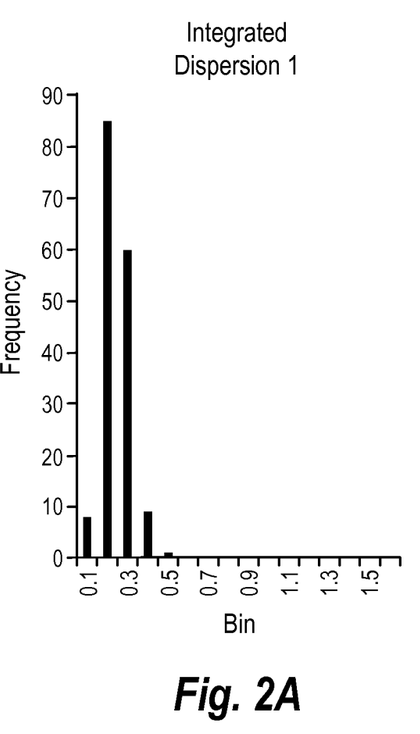
FIGS. 2A-2B are histograms of sample interparticle distance for three different integrated dispersions in accordance with the teachings herein.
Figure 2B:
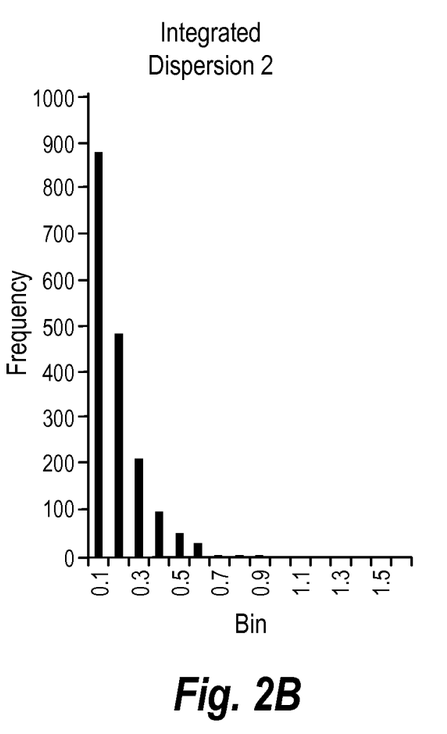

FIGS. 1A-1C are histograms of sample interparticle distances for Examples 1-3, respectively. FIGS. 2A-2B are histograms of sample interparticle distances for Examples 4-5, respectively. These diagrams show the distances measured between any two unobstructed pigment particles captured in an SEM analysis. The bin sizes are kept constant, and by looking at the width of the histogram, it shows the discrepancies between distances measured in each sample. For example, if all particles were evenly distributed, the inter-particle distance between any two unobstructed pigment particles should be the same. Then there should only be 1 bin and the width of the histogram would be very narrow. Alternatively, as the variance may be interpreted, the narrower the distance distribution, the more uniformly distributed are the pigments. The calculated variance of all the samples is shown in Table III, below.

The interparticle distance is an indication of dispersion quality of pigment within the polymer matrix. The narrower the distribution, the more evenly the particles are distributed. Reference inks were prepared using a traditional milling method, which typically requires about 80 hours of processing time. In the case of integrated dispersions in accordance with the examples described herein, the inks were processed for about 8 to 10 hours.

Based on the results, it appears that the extruded samples have a pigment distribution within the specification of the Reference 1-3 samples (both average distance and standard deviation). This implies that mechanical extrusion may be very effective in dispersing pigment particles in the polymer matrix (milling requires tens of hours, whereas extrusion was at a lab-scale rate of 36 to 39 g/min, which is ~2.3 kg/hr). The production throughput may be expected to be at least three times the current throughput of white ink.

Due to limited supply of materials, it was only possible to generate enough ink for one on-press with 45 wt % pigment loading, as opposed to 60 to 65 wt % in Reference Samples 1-3. Table III below summarizes the performance of extruder/milling ink in comparison to Reference Samples 1-3. While the opacity of ID 2 was not as high as Reference 3, which is due partially to the lower pigment loading, there was an improvement in print background. But in summary, the making of extruder/attritor ink was very fast, provided the initial ink paste was made at 36-39 g/min at a lab scale, followed by 8 hours of grinding. The resulting ink particles also exhibited tentacular (tentacle-like) shapes, which are believed to provide more surface area for charging.

The print qualities are summarized below in Table III below, which shows the ink layer thickness that gave the measured opacity and opacity:

TABLE III

Print Qualities of Reference Samples and Dispersed Samples.

|  | Reference 1 | Reference 2 | Reference 3 | ID 1 | ID 2 |
|---|---|---|---|---|---|
| Maximum, μm | 1.21 | 1.05 | 1.36 | 1.06 | 1.11 |
| Minimum, μm | 0.01 | 0.01 | 0.01 | 0.02 | 0.02 |
| Mean, μm | 0.12 | 0.17 | 0.23 | 0.26 | 0.25 |
| Ink thickness, μm | 2.35 | 1.36 | 0.93 | 0.83 | 1.29 |
| Opacity | 63.5 | 58.4 | 48.8 | 32 | 46.9 |
| Effective PL | 1.53 | 0.88 | 0.60 | 0.37 | 0.58 |
| Efficiency | 41.5 | 66.4 | 81.3 | 86.5 | 80.7 |

ID 1 and ID 2 refer to printed images using the integrated dispersion white ink disclosed herein. Patches of all the samples summarized in Table III were studied by SEM. These SEM images were used to determine the above statistics, shown in Table II. In order to have a fair comparison of all the samples, the ink layer thickness and the amount of pigment loading (PL) present in the print were normalized. Efficiency was calculated for this comparison. Efficiency=Opacity/Effective PL, where Effective PL=% PL*ink film thickness. As shown in Table III, while ID inks used ~25 to 30% less pigment in the ink, the resulting opacity is not very far from the reference inks which used more pigment and printed with thicker ink layers.

Figure 3:
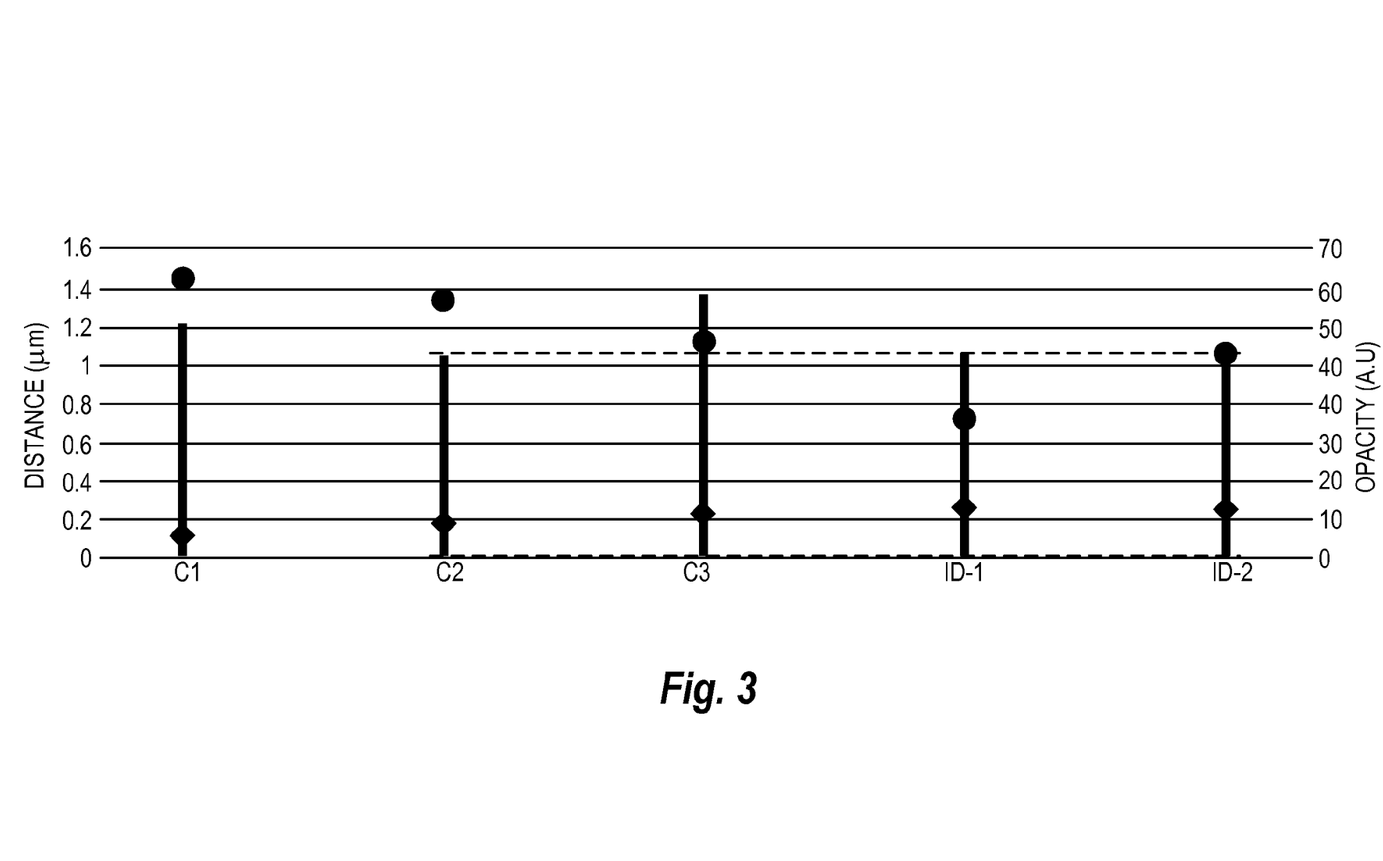
FIG. 3, on coordinates of distance (in μm) on the left ordinate, opacity (in Arbitrary Units) and sample on the absissa, is a plot of the printing results for the samples shown in FIGS. 1A-1C and 2A-2B.

The data are plotted in FIG. 3, in which the distance (in μm) is plotted along the left ordinate, opacity is plotted on the right ordinate, and each sample is plotted on the abcissa.

Although made with less pigment (ID 2), an opacity was achieved that was close to reference (Reference 3) due to better distribution of pigment within the polymer matrix (the length of the vertical bar for each sample corresponds to the range of particle distance distribution). Therefore, the overall refractive index in the ink prepared in accordance with the teachings herein improved. Opacity is dependent on the difference in refractive index (R.I.) of materials that make up the bulk matrix. When $TiO_2$ pigment particles (R.I. 2.6) are evenly dispersed in the polymer resin (R.I. 1.5), they form intercalated regions of different refractive indexes. Light changes direction when it enters region of different R.I. In the case of opaque materials, light rays keep changing directions but they do not travel through the matrix. (If light rays pass through a medium without a change in direction, then the medium is considered to be transparent, if light rays pass through a medium but with changed direction, then the medium is considered to be translucent. If light rays enter but do not pass through a medium, then the medium is considered to be opaque). By evenly dispersing pigment in polymer, these intercalated zones are maximized, thereby maximizing the change in light direction to prevent light from passing through and therefore producing an opaque matrix.

Figure 4:
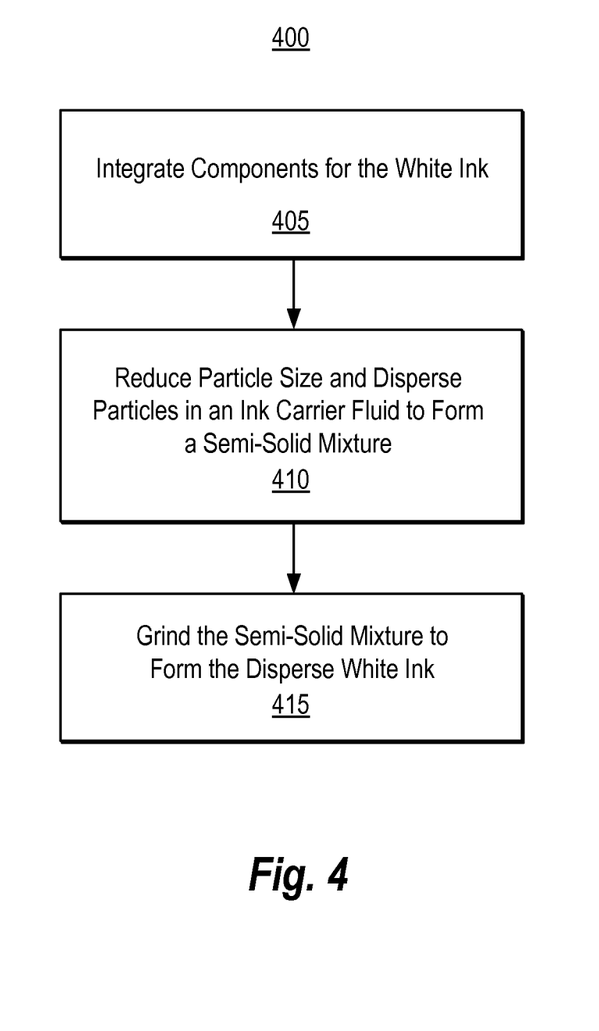
FIG. 4 is a flow chart of a process for manufacturing a dispersed white ink containing TiO$_2$ pigment, according to an example.

A process for manufacturing a dispersed white ink containing $TiO_2$ pigment is depicted in FIG. 4. The process 400 includes integrating 405 components for the white ink. The process 400 further includes reducing 410 particle size and dispersing particles in an ink carrier fluid to form a semi-solid mixture.

The process 400 concludes with grinding 415 the semi-solid mixture to form the dispersed white ink. The details of the steps are described above.

In addition to the benefits provided by the process disclosed herein, a substantial advantage is the reference samples (Reference 1-3) took 80 hours to mill, which is typical for such inks. On the other hand, the ID inks (ID 1-2) were made after only 8 hours of milling, a 90% reduction in process time.

What is claimed is:

1. A dispersed white ink containing $TiO_2$, wherein the $TiO_2$ comprises particles contained in a thermoplastic polymer resin matrix and wherein the particles have a maximum interparticle distance of less than 1.0 μm and exhibiting a statistical variance of less than 0.02.

2. The dispersed white ink of claim 1, wherein the thermal polymer resin matrix comprises a thermoplastic composition that is colorless and translucent to at least visible radiation.

3. The dispersed white ink of claim 1, wherein the ink has a non-volatile solids content within a range of 1 to 10 wt %.

4. The dispersed white ink of claim 1, wherein the ink has a composition:

| | |
|---|---|
| thermoplastic resin | 11 to 89 wt %; |
| TiO$_2$ | 10 to 65 wt %; |
| secondary pigment | 0 to 3 wt %; |
| aluminum stearate | 0 to 1 wt %; |
| other additives | 1 to 5 wt %; |
| silicone oil | 0 to 5 wt %; |
| charge director | 0.1 to 10 wt %; and |
| isoparaffinic liquid | balance. |

5. A process for manufacturing a dispersed white ink containing TiO$_2$ pigment, the process including:
  integrating components for the white ink;
  reducing particle size and dispersing particles in an ink carrier fluid to form a semi-solid mixture; and
  grinding the semi-solid mixture to form the dispersed white ink.

6. The process of claim 5, wherein the process further includes forming pellets of solids containing the integrated component after integrating the components for the white ink.

7. The process of claim 5, wherein components for the white ink include solid materials comprising about 20 to 100 wt % of the total composition and liquid materials comprising 0 to about 80 wt % of the total composition.

8. The process of claim 7, wherein the components include the TiO$_2$ pigment, a thermoplastic polymer resin, and the ink carrier fluid.

9. The process of claim 8, wherein the components include:

| | |
|---|---|
| thermoplastic resin | 11 to 89 wt %; |
| TiO$_2$ | 10 to 65 wt %; |
| secondary pigment | 0 to 3 wt %; |
| aluminum stearate | 0 to 1 wt %; |
| other additives | 1 to 5 wt %; |
| silicone oil | 0 to 5 wt %; |
| charge director | 0.1 to 10 wt %; and |
| isoparaffinic liquid | balance. |

10. The process of claim 5, wherein integrating the components is performed with an extruder two or more mixing zones, a first zone for dispersing TiO$_2$ pigment into a melted thermoplastic extrusion resin to form a polymer-pigment combination and a second zone for mixing the polymer-pigment composition with the ink carrier fluid.

11. The process of claim 5, wherein reducing the particle size is performed by milling, grinding, or a combination of milling and grinding.

12. The process of claim 5, wherein dispersing the particles in the ink carrier fluid by homogenizing, microfluidizing, or a combination of homogenizing and microfluidizing.

13. The process of claim 5, wherein grinding the semi-solid mixture is performed in a bead mill or attritor with beads having a size ranging from 2 to 10 mm at a rate of 100 to 1000 rpm for 5 to 50 hours to form the dispersed white ink.

14. The process of claim 13, wherein the dispersed white ink is diluted with additional ink carrier fluid to a concentration of about 1 to 10 wt % non-volatile solids.

15. The process of claim 5, wherein the ink carrier fluid comprises an isoparaffinic liquid.

\* \* \* \* \*